April 5, 1927.

M. SMITHEY

METER

Original Filed May 23, 1916    4 Sheets-Sheet 1

1,623,562

WITNESSES:
E. M. Callaghan
L. A. Stanley

INVENTOR
MARVIN SMITHEY,
BY
ATTORNEYS

April 5, 1927.   M. SMITHEY   1,623,562
METER
Original Filed May 23, 1916   4 Sheets-Sheet 2
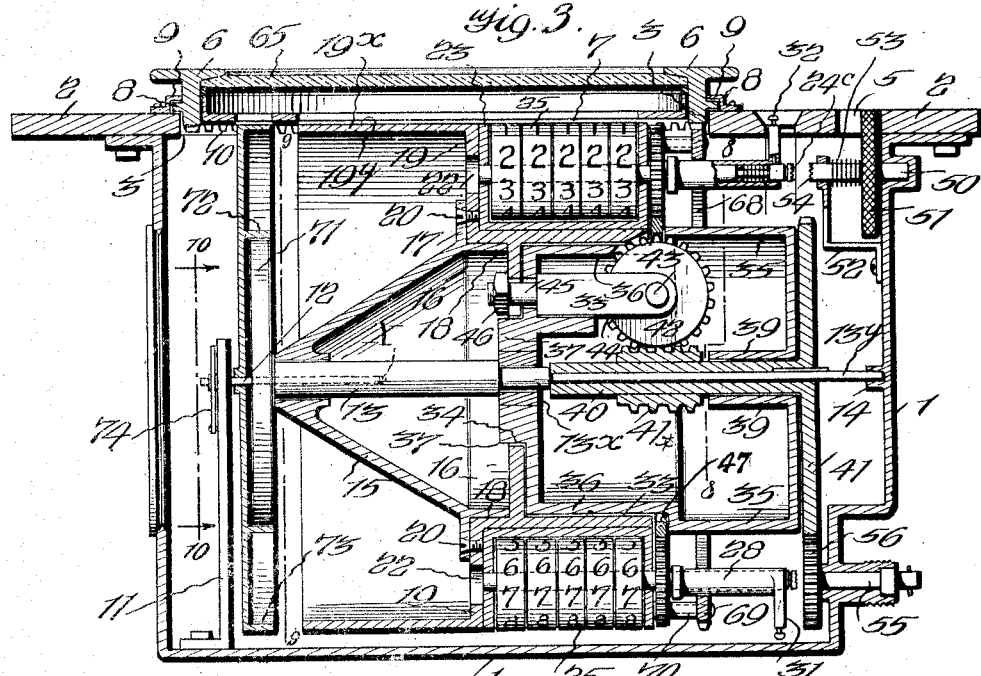
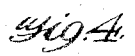
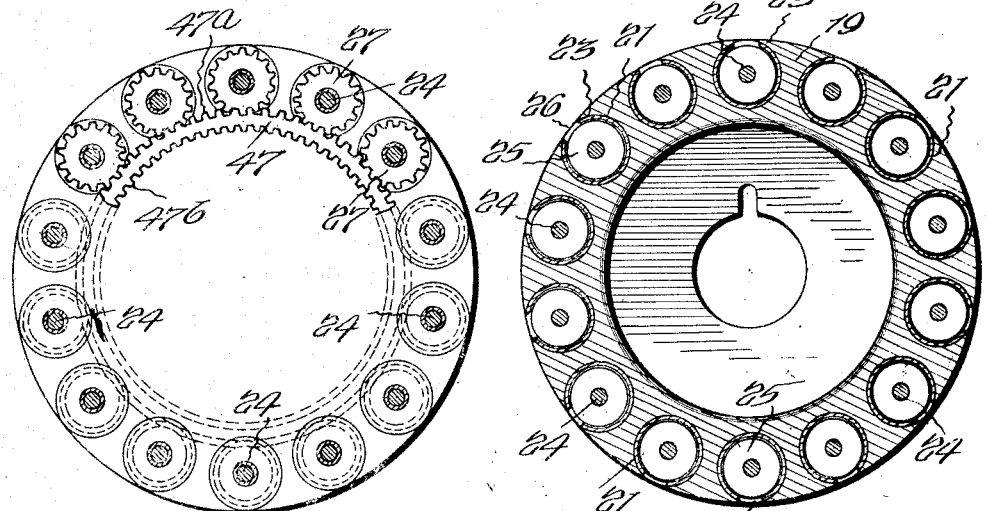
WITNESSES:
E. W. Carraghan
L. A. Stanley
INVENTOR
MARVIN SMITHEY,
BY
ATTORNEYS

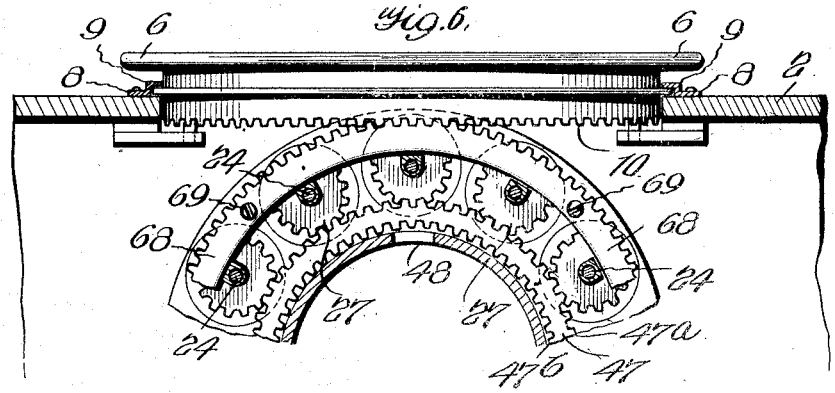
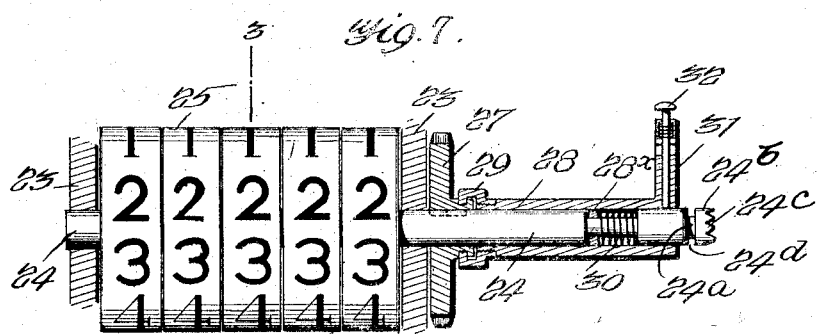
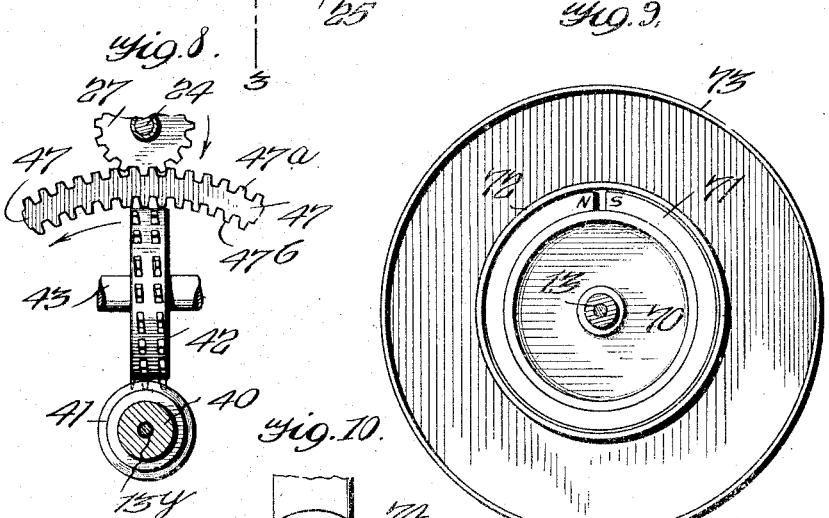
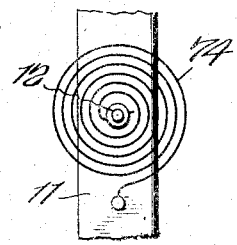

April 5, 1927.
M. SMITHEY
METER
Original Filed May 23, 1916    4 Sheets-Sheet 4
1,623,562
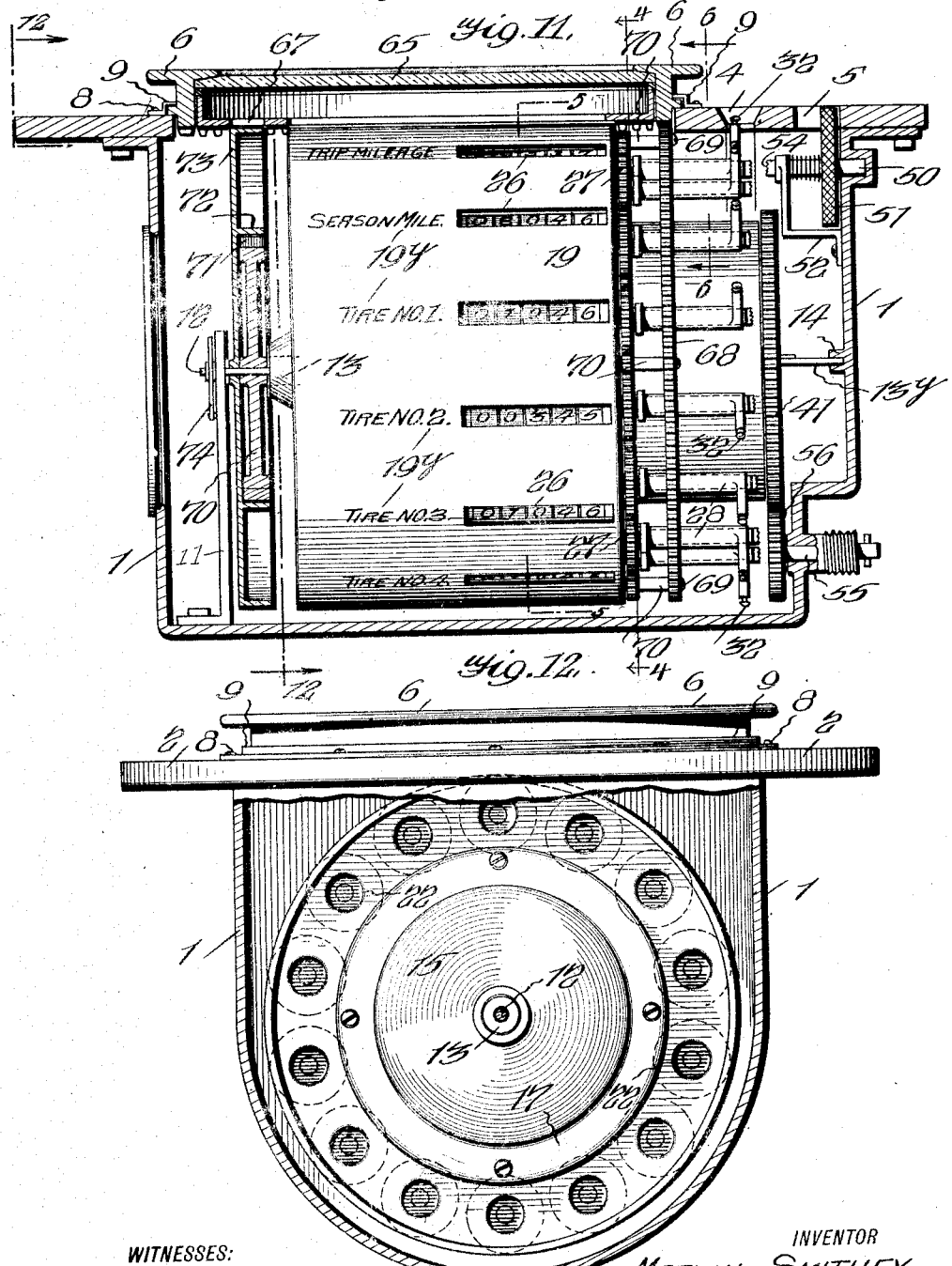
WITNESSES:
E.W. Carraghan
L.A. Stanley
INVENTOR
MARVIN SMITHEY,
BY
ATTORNEYS Patented Apr. 5, 1927.

1,623,562

UNITED STATES PATENT OFFICE.

MARVIN SMITHEY, OF LAWRENCEVILLE, VIRGINIA.

METER.

Application filed May 23, 1916, Serial No. 99,344. Renewed May 25, 1922. Serial No. 563,675.

My invention relates to improvements in meters, and it consists in the combinations, constructions, and arrangements herein described and claimed.

An object of my invention is to provide a device having a plurality of odometers, each odometer being associated with a particular feature connected with automobiles, motor vehicles, and the like, said odometers being driven simultaneously by a common driving means, and being capable of being disconnected from the common driving means and held out of engagement therewith at will.

A further object of my invention is to provide a device of the type described in which a relatively large number of odometers may be grouped together for simultaneous actuation in a small compass, so that the meter as a whole may be very little lighter than the ordinary meters which contain a speedometer and odometers for the trips and season mileage.

Other objects and advantages will appear in the following specification, and the novel features of the invention will be particularly pointed out in the appended claims.

My invention is illustrated in the accompanying drawings, forming part of this application, in which:

Figure 3 is a section along the line 3—3 of Figure 1.

Figure 4 is a section along the line 4—4 of Figure 11.

Figure 5 is a section along the line 5—5 of Figure 11.

Figure 6 is a section along the line 6—6 of Figure 11.

Figure 7 is a detail view of one of the odometers.

Figure 8 is a section along the line 8—8 of Figure 3.

Figure 9 is a section along the line 9—9 of Figure 3.

Figure 10 is a section along the line 10—10 of Figure 3.

Figure 11 is a sectional view somewhat similar to Figure 3, but showing the odometer drum in elevation.

Figure 12 is a section along the line 12—12 of Figure 11.

Figure 1:
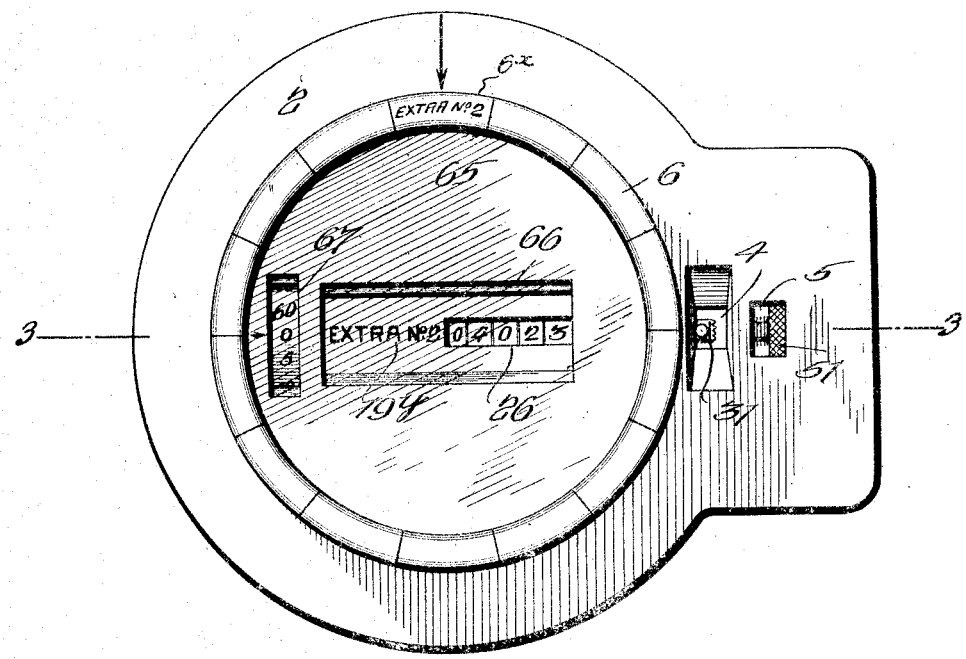
Figure 1 is a plan view of the device.
Figure 2:
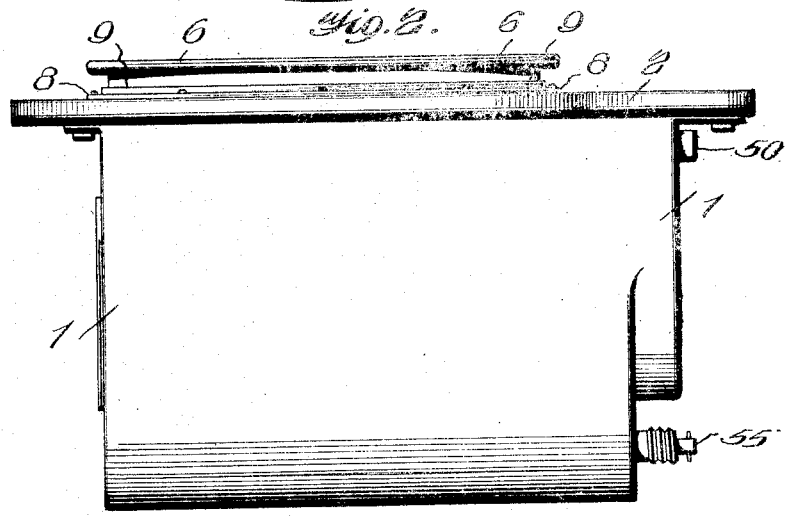
Figure 2 is a side elevation.

In carrying out my invention, I provide a casing 1 of the shape best shown in Figures 3 and 11 having secured thereto a top 2 provided with a large circular opening 3 and smaller openings 4 and 5. Disposed within the opening 3 is a circular cap or face plate 6 which has a window 7 and is provided with a circumferential flange 8, see Figure 3, arranged to engage the wall of the opening 3. Overlying the flange 8 is a retaining device 9, which may be a split ring of Z-shaped cross section, whose purpose is to keep the plate in position, while at the same time permitting the rotation of the plate around its central axis. The bottom portion of the plate 6 is provided with teeth 10 arranged in circular manner, and which constitutes a gear.

Referring now particularly to Figure 3, it will be seen that I have provided within the casing 1, an upright 11 in which is journaled a small shaft 12. This shaft fits into the bore X of the shaft 13. The latter has a reduced portion $13^x$, and a further reduced portion $13^y$, whose end is journaled in a bearing 14 in the casing 1. The shaft 12 turns loosely with respect to the shaft 13. Keyed or otherwise firmly secured to the shaft 13, is a cone-shaped retaining member 15 having an annular flange 16, and a circular flange 17 at right angles thereto, the flange 16 being arranged to enter the circular opening or recess 18 of the odometer bearing drum 19, and the flange 17 abutting the drum in the manner clearly shown in Figure 3, and being secured to it by means of screws 20 or in any other suitable manner.

As will be seen from Figure 5, the drum 19 is provided with a series of bores extending parallel with the axis of the shafts 13, $13^x$, and $13^y$, these bores being shown at 21. The bores do not extend entirely through the main body portion of the drum 19, but terminate short thereof. Small bores 22 form a continuation of the larger bores 21.

Disposed in each of the bores 21 is an odometer. Each of these odometers consists of a casing 23 in which is journaled a shaft 24 bearing odometer wheels 25. Each odometer casing is provided with a window 26 through which the number wheels may be viewed, see Figure 5. In view of the fact that certain mechanisms associated with these odometers are alike for all the odometers, a description of one will suffice for all. The shaft 24 of each odometer has feathered to it a gear 27, which gear is slidable with respect to the shaft, being moved by a sleeve 28 Fig. 7 bearing a flanged collar 29 which engages the hub of the gear 27 so as to permit the rotation of the gear, but to cause the movement of the gear along the shaft 24, as the sleeve 28 is moved. The shaft 24 has a reduced portion 24$^a$, leaving a head 24$^b$, at the end of which is a clutch member 24$^c$. The interior of the sleeve is provided with a flange 28$^x$, which is normally pressed upon by a spring 30. This tends to force the sleeve 28, and hence the gear 27, toward the left in Figure 7, or close up against the casing 23. The sleeve has an arm 31 projecting from it laterally, which arm has a spring pressed locking pin 32. The sleeve and the gear 27 may be pulled outwardly, that is to the right in Figure 7, by taking hold of the arm 31 and moving it to the right, against the tension of the spring 30. When the pin 32 clears the head 24$^b$, it will drop in behind it, that is to say, in the slot 24$^a$, and will retain the sleeve and the gear in their shifted positions, until the pin is pulled outwardly, whereupon the spring 30 will return these parts to their normal positions.

On the opposite end of the drum from the bore 18, is an inwardly extending bore 33 Fig. 3 of the same diameter as the bore 18, and communicating with the latter by a central opening 34. A housing 35 has a reduced cylindrical portion 36 which enters the bore 33 and is provided with a further reduced portion 37 which enters the central opening 34. The housing 35 has a tubular portion 39 surrounding an elongated hub 40, of the gear 41. The hub and gear are keyed to the shaft 13$^y$. The hub 40 is provided with a worm 41$^x$ which is arranged to engage a gear 42 journaled at 43 on a bracket 44 having a threaded reduced portion 45 by means of which the bracket may be secured to the housing 35 and the latter may be secured to the body portion of the drum 19 by means of the nut 46.

Disposed on the exterior of the reduced portion 36 of the housing, is a gear ring 47, which is provided on its external periphery with teeth 47$^a$, Fig. 4 and on its inner edge with teeth 47$^b$. The teeth 47$^b$ engage the portion 36 of the housing, the latter forming a bearing for the gear ring as stated, see Figures 6 and 8. The housing is provided with an opening 48 by means of which the gear 42 may be brought into engagement with the teeth 47$^b$ of the gear ring. The outer row of teeth 47$^a$ of the gear ring are in mesh with all of the gears 27 of the odometers. The gear 42, see Figure 8, has its teeth set in spiral rows, so that as the worm 41 turns the gear 42 is driven, and in turn drives the gear ring 47.

Disposed within the casing near the upper part thereof is a longitudinally slidable shaft 50 Fig. 3 upon which is mounted a thumb wheel 51. One end of the shaft is journaled in the casing and the other on a bracket 52. A spring 53 is disposed between the end of the bracket and the thumb wheel, and tends normally to keep the wheel in the position shown in Figure 3. At the end of the shaft is a clutch member 54, which is arranged to engage the clutch member 24$^c$ of any of the odometers when the latter are brought into engaging position, as will be explained later.

At 55 I have shown a shaft whose outer end is arranged to be connected with any suitable driving mechanism, as for instance, the flexible driving mechanism connecting the wheel of the vehicle with the ordinary speedometer. This shaft 55 is provided with a gear 56 which is in mesh with the gear 41.

The specific construction of the individual odometers forms no part of the present invention. I prefer, however, to have odometers of the type whose wheels are turned successively to record the proper mileage when the shaft 24 is turned in one direction, and whose number wheels are brought back to zero, or may be reset by the reverse movement of the shaft. The zero setting means also forms no part of the invention.

From the foregoing description of the various parts of the device, the operation thereof may be readily understood. As will be seen from Figures 3 and 11, the drum 19 is prolonged at 19$^x$ and legends 19$^y$ are disposed opposite the various openings 26 designating the feature with which the odometer is associated. The same legends appear at 6$^x$ on the face plate 6 Fig. 1. Disposed between the window 7 and the drum is a plate 65, having an opening 66 arranged to register with one of the legends 19$^y$ and its associated opening 26 for viewing the numerals of the odometer. The plate 65 also has an opening 67 for viewing the speedometer wheel.

Let us assume that we are to record the mileage of extra tire number two. The upper part of the face plate 6 is revolved by hand until the legend "Extra No. 2," coincides with the arrow in Figure 1. This rotates the gear 68, see Figures 3, 6, and 11, which is secured to the drum 19 by means of pins 69 being spaced from the drum by means of sleeves 70 through which the pins pass, see Figures 3 and 11. The drum is therefore carried around until the odometer corresponding to "Extra tire No. 2," comes into position before the window 66. Now by reaching through the opening 4 and moving the arm 31 to the right, the gear 27, see Figure 7, of the odometer corresponding to extra tire No. 2 will be moved out of mesh with the teeth 47$^a$ of the gear ring 47. Now by pushing the thumb wheel 51 toward the left in Figures 1 and 3, the clutch 54 will be brought into engagement with the clutch 24$^c$, so that the odometer shaft 24 may be reversed to reset the odometer to zero. As before explained, the spring pin 32 will retain the gear 27 out of engagement with the teeth 47ª of the gear ring 47, until the pin is released. As soon as the pin is released, the gear 27 will again engage the teeth of the gear ring 47. The drive shaft 55 communicates motion to the gear 41, see Figure 3, through the medium of the gear 56. The gear 41 turns the shaft 13ʸ upon which the worm 41ˣ is mounted, thus turning the gear 42, rotating the gear ring 47, and driving all of the odometers simultaneously through the engagement of their gears 27 with the gear ring. The mileage of the extra tire may, therefore, be accurately determined.

Similarly any of the odometers may be brought into position to be reset or disengaged, and each odometer may be disengaged permanently. It will be observed that, as the drum 19 is turned, the arm 31 which is secured to the sleeve 28, must be held in a radial position with respect to the axis of the drum, and to this end the sleeve 28 is made flat on that side facing the inner rim of the gear 68, see Figure 6. This prevents the rotation of the sleeve 28 but permits its longitudinal movement for the purpose of disengaging the odometer.

In connection with the odometers I may provide a speedometer. In Figure 11 I have shown the shaft 13 as being provided with a wheel 70 bearing a magnet consisting of a magnetized split ring. This magnet is adjacent to an inwardly extending flange 72 carried by a wheel 73 secured to the shaft 12. The latter is provided with a spring 74, one end of which is secured to the standard 11. The periphery of the wheel 72 bears numerals indicating miles per hour, which may be viewed through the window 67.

The revolution of the wheel 70 and its magnet 71 will cause a magnetic drag on the flange 72 of the wheel 73, and will thus cause the turning of the latter against the tension of the spring 74, a distance proportional to the speed of the revolution of the magnet, thus indicating the speed in miles per hour at the window 67.

I claim:—

1. A meter comprising a casing having a reading opening, a shaft disposed within the casing, means for rotating the shaft, a support disposed within the casing and rotatable with respect to the axis of the shaft, a plurality of odometers carried by the support, a worm carried by the shaft, a worm wheel in mesh with said worm, a gear ring mounted on said support for rotation around its central axis, the teeth of the worm wheel being arranged in helical form to constitute a worm and arranged to engage the gear ring for rotating the latter, and means carried by each odometer and arranged to be engaged by said gear ring for causing the simultaneous movement of the odometers when the gear ring is turned.

2. A meter comprising a casing having a reading opening, a shaft disposed within the casing, means for rotating the shaft, a drum disposed within the casing and rotatable about the axis of the shaft, a worm carried by the shaft, a worm wheel arranged to engage said worm, said worm wheel being disposed within the drum, the teeth of the worm wheel being arranged in helical form to constitute a worm, a gear ring rotatably carried by the drum, the axis of the worm wheel being in the plane of the gear ring, said gear ring having teeth on its internal and on its external edges, said drum having an opening to permit the engagement of the teeth of the worm wheel with the internal teeth of the gear ring, a plurality of odometers carried by the drum, each of said odometers being provided with a gear wheel arranged to engage the teeth on the exterior edge of the gear ring whereby the odometers are driven simultaneously.

3. In a meter, a casing, a central shaft therefor, means for rotating said central shaft, a drum rotatable around the axis of said central shaft, a plurality of odometers carried by said drum, the shaft of each of said odometers being provided with a gear, a common driving gear in engagement with the individual gears of said odometers for driving the latter simultaneously, a cylindrical housing provided with an opening arranged to form a bearing for said common driving gear, said common driving gear having teeth on its inner bearing surface, a combined worm wheel and gear carried by said housing and arranged to engage the inner teeth of said common driving gear, and a worm carried by said shaft and disposed within said housing for communicating the motion of the shaft to the combined worm and gear.

4. In a meter, a central shaft, a drum rotatable about the axis of the shaft and having an opening, a plurality of odometers carried by the drum, and means for transmitting the power of the shaft to the odometers for driving them, through said opening.

5. A meter comprising a casing having a single reading opening, a shaft disposed within the casing, means for rotating the shaft, a drum disposed within the casing, the axis of the drum being coincident with the axis of the shaft, said drum having an opening, a plurality of odometers carried by the drum on the exterior thereof, means associated with all the odometers for actuating them, transmission means disposed within the drum and operated by the shaft, and means extending through the opening in the drum for transmitting the movement of the transmission means to the odometer actuating means.

6. In a meter, a shaft, a drum rotatable about the axis of the shaft and having an opening, a plurality of odometers carried by the drum on the outer surface thereof, a common driving member for all of said odometers having a portion arranged to extend through said opening, and means disposed within the drum for transmitting power from the shaft to said common driving member.

7. In a meter, a shaft, a drum rotatable about the axis of the shaft and having an opening, a plurality of odometers carried by the drum on the outer surface thereof, a gear ring rotatably disposed on said drum and having a portion arranged to extend through said opening, and means disposed within the drum for transmitting power from the shaft to said gear ring, said gear ring being arranged to engage all of said odometers to drive them simultaneously.

MARVIN SMITHEY.